(12) United States Patent
Otake et al.

(10) Patent No.: US 9,771,054 B2
(45) Date of Patent: Sep. 26, 2017

(54) TRAVEL RESISTANCE ARITHMETIC DEVICE

(71) Applicants: Hirotada Otake, Susono (JP); Eiji Sakaguchi, Susono (JP)

(72) Inventors: Hirotada Otake, Susono (JP); Eiji Sakaguchi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/771,882

(22) PCT Filed: Apr. 2, 2013

(86) PCT No.: PCT/JP2013/060118
§ 371 (c)(1),
(2) Date: Sep. 1, 2015

(87) PCT Pub. No.: WO2014/162522
PCT Pub. Date: Oct. 9, 2014

(65) Prior Publication Data
US 2016/0016564 A1 Jan. 21, 2016

(51) Int. Cl.
*B60T 8/172* (2006.01)
*G01C 21/36* (2006.01)
(Continued)

(52) U.S. Cl.
CPC .............. *B60T 8/172* (2013.01); *B60T 8/245* (2013.01); *B60W 40/076* (2013.01);
(Continued)

(58) Field of Classification Search
CPC ...... B60T 8/172; B60T 8/245; B60T 2201/04; G08G 1/0112; G08G 1/0129;
(Continued)

(56) References Cited

U.S. PATENT DOCUMENTS 5,760,713 A * 6/1998 Yokoyama ......... G01C 21/3461
340/905
5,832,400 A 11/1998 Takahashi et al.
(Continued)

FOREIGN PATENT DOCUMENTS

| JP | 08-072591 A | 3/1996 |
| JP | 2011-016464 A | 1/2011 |
| JP | 2011-022643 A | 2/2011 |
| JP | WO 2014162522 A1 * 10/2014 .......... B60W 40/076 |

OTHER PUBLICATIONS

International Search Report of PCT/JP2013/060118 dated Jul. 2, 2013 [PCT/ISA/210].

*Primary Examiner* — Redhwan k Mawari
*Assistant Examiner* — Michael Whalen
(74) *Attorney, Agent, or Firm* — Sughrue Mion, PLLC

(57) ABSTRACT

A travel resistance arithmetic device includes: a controller configured to estimate travel resistance which a vehicle receives from a travel road; and a memory configured to store the travel resistance in association with positional information. The controller is configured to: correct, based on difference between a stored value of the travel resistance stored in the memory in association with a predetermined area on the travel road through which the vehicle has already passed and an estimated value of the travel resistance estimated by the controller in the predetermined area, the stored value stored in the memory in association with a correction target area on the travel road and; output the corrected stored value as the travel resistance in the correction target area while the vehicle travels the travel road.

16 Claims, 8 Drawing Sheets

(51) Int. Cl.
*B60W 40/076* (2012.01)
*B60W 40/10* (2012.01)
*G08G 1/01* (2006.01)
*B60T 8/24* (2006.01)

(52) U.S. Cl.
CPC ..... *B60W 40/1005* (2013.01); *G01C 21/3697* (2013.01); *G08G 1/0112* (2013.01); *G08G 1/0129* (2013.01); *G08G 1/0141* (2013.01); *B60T 2201/04* (2013.01); *B60W 2550/142* (2013.01)

(58) Field of Classification Search
CPC .......... B60W 40/076; B60W 40/1005; B60W 2550/142; G01C 21/3697
See application file for complete search history.

(56) References Cited

U.S. PATENT DOCUMENTS

| | | | |
|---|---|---|---|
| 2003/0135320 A1* | 7/2003 | Bellinger | B60W 30/18 701/103 |
| 2011/0276209 A1* | 11/2011 | Suganuma | B60W 10/06 701/22 |
| 2011/0307204 A1* | 12/2011 | Cho | B60T 8/172 702/96 |
| 2014/0214318 A1* | 7/2014 | Johansson | G01C 21/32 701/532 |
| 2016/0114794 A1* | 4/2016 | Sakaguchi | B60W 30/025 701/72 |
| 2016/0129904 A1* | 5/2016 | Shin | B60W 20/40 701/22 |

* cited by examiner

TRAVEL RESISTANCE ARITHMETIC DEVICE

CROSS REFERENCE TO RELATED APPLICATIONS

This application is a National Stage of International Application No. PCT/JP2013/060118, filed Apr. 2, 2013, the contents of which are incorporated herein by reference in its entirety.

FIELD

The present invention relates to a travel resistance arithmetic device.

BACKGROUND

A technique for instructing a driver to perform decelerating operation such as accelerator off operation when a vehicle stops has been conventionally known as one of driving assistance techniques for assisting the driver in driving the vehicle. For example, Patent Literature 1 discloses a technique of setting timing of the decelerating operation based on magnitude of travel resistance which a vehicle receives from a road surface when the vehicle enters an intersection.

CITATION LIST

Patent Literature

Patent Literature 1: Japanese Patent Application Laid-open No. 2011-022643

SUMMARY

Technical Problem

Herein, the travel resistance easily changes according to various travel environments such as a road surface condition (dry/wet), a wind speed, and a vehicle weight, for example, and the travel resistance stored in advance might be different from actual travel resistance. Under such a condition, timing of the decelerating operation set based on information of given travel resistance is not necessarily based on the actual travel environment and there is a case in which the driving assistance is not appropriate.

The present invention is achieved in view of the above-described circumstances and an object thereof is to provide the travel resistance arithmetic device capable of estimating the travel resistance of the vehicle with high accuracy.

Solution to Problem

To solve the problem, a travel resistance arithmetic device according to the present invention includes: resistance estimating means which estimates travel resistance which a vehicle receives from a travel road; and storing means which stores the travel resistance in association with positional information, wherein, based on difference between a stored value of the travel resistance stored in the storing means in association with a predetermined area on the travel road through which the vehicle has already passed and an estimated value of the travel resistance estimated by the resistance estimating means in the predetermined area, the stored value stored in the storing means in association with a correction target area on the travel road is corrected to be output as the travel resistance in the correction target area while the vehicle travels the travel road.

Moreover, it is preferable that the travel resistance arithmetic device corrects the stored value stored in the storing means in association with the correction target area in further consideration of the difference between the stored value and the estimated value of the travel resistance in a past predetermined area through which the vehicle has passed before the predetermined area and outputs it as the travel resistance in the correction target area.

Moreover, it is preferable that the travel resistance arithmetic device changes a process of correcting the stored value according to a degree of separation between the correction target area and a previous correction target area through which the vehicle has already passed.

Moreover, in the travel resistance arithmetic device, it is preferable that the storing means stores the estimated value of the travel resistance estimated by the resistance estimating means as the stored value.

Moreover, it is preferable that the travel resistance arithmetic device performs the correction based on difference between travel resistance information obtained by arbitrating travel resistance information based on a travel history of an own vehicle stored in the storing means, geographical information stored in map information, and travel resistance information based on a travel history of another vehicle externally obtained, and the estimated value of the travel resistance estimated by the resistance estimating means in the predetermined area.

Advantageous Effects of Invention

The travel resistance arithmetic device according to the present invention has an effect of inhibiting the travel resistance output during the vehicle travel from being different from the actual travel resistance and of estimating the travel resistance with high accuracy.

DESCRIPTION OF EMBODIMENTS

Figure 1:
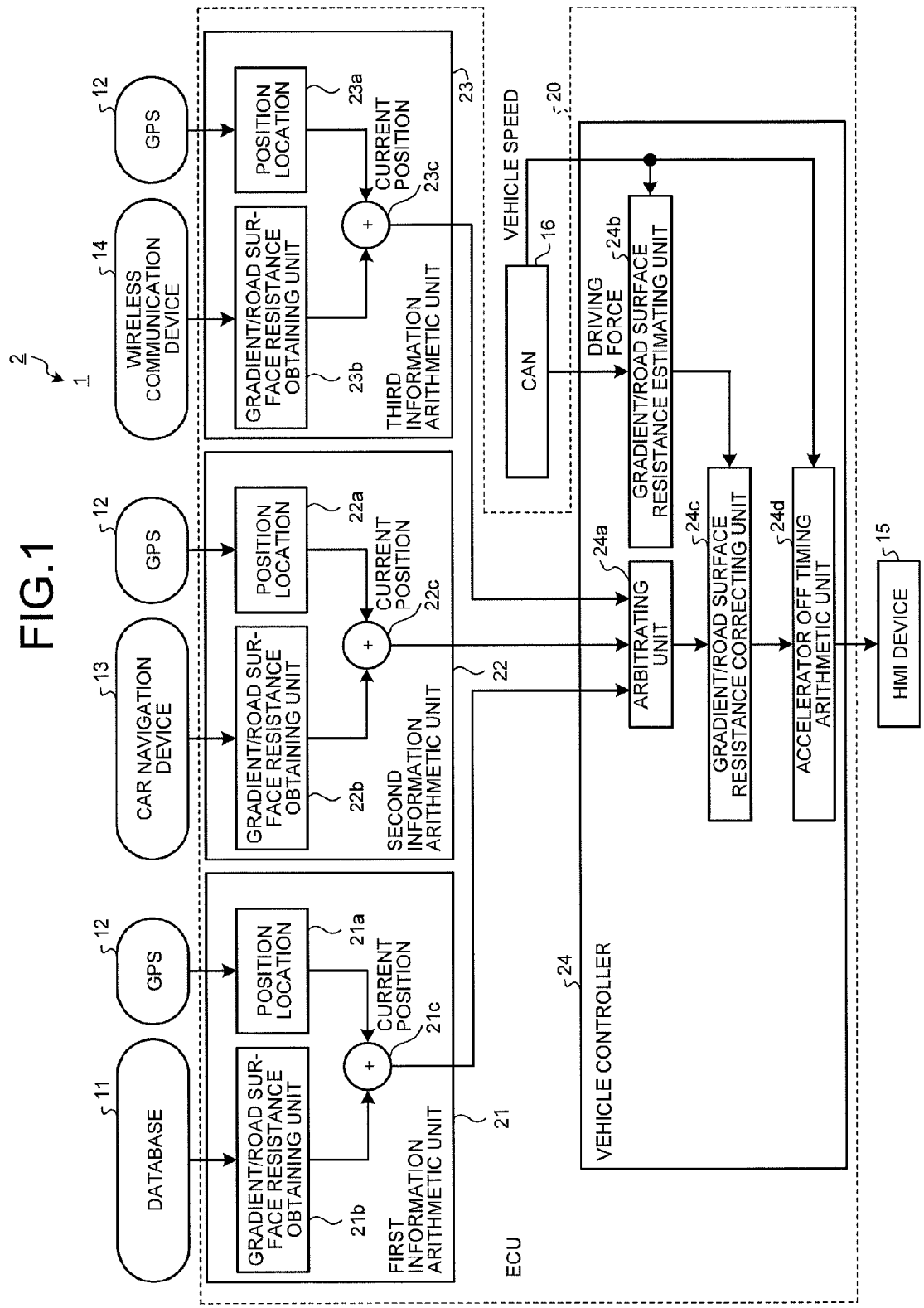
FIG. 1 is a block diagram illustrating a schematic configuration of a driving assistance device of a vehicle to which a travel resistance arithmetic device according to a first embodiment of the present invention is applied.

Embodiments of a travel resistance arithmetic device according to the present invention are hereinafter described with reference to the drawings. Meanwhile, in the following drawings, the same reference numeral is assigned to the same or corresponding parts and the description thereof is not repeated.

First Embodiment

A first embodiment is described with reference to FIGS. 1 to 4.

Figure 2:
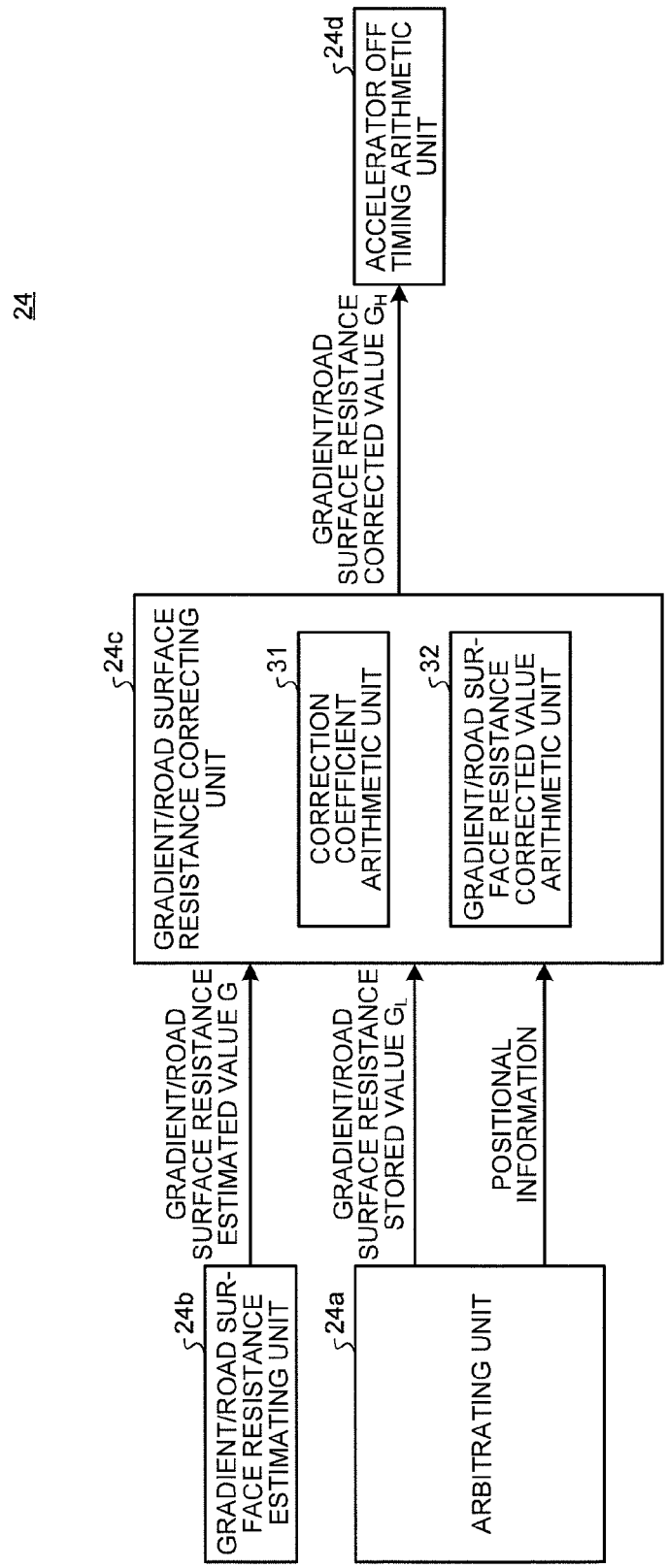
FIG. 2 is a functional block diagram illustrating a function of a gradient/road surface resistance correcting unit in FIG. 1 in detail.

A configuration of a travel resistance arithmetic device according to the first embodiment is first described with reference to FIGS. 1 and 2. FIG. 1 is a block diagram illustrating a schematic configuration of a driving assistance device of a vehicle to which the travel resistance arithmetic device according to the first embodiment of the present invention is applied and FIG. 2 is a functional block diagram illustrating a function of a gradient/road surface resistance correcting unit in FIG. 1 in detail.

As illustrated in FIG. 1, a driving assistance device 1 to which the travel resistance arithmetic device according to this embodiment is applied is mounted on a vehicle 2 as an own vehicle and is provided with a HMI (human machine interface) device 15 and an ECU (electronic control unit) 20.

The driving assistance device 1 is a look-ahead information eco-driving assistance system which utilizes so-called look-ahead information. That is to say, the driving assistance device 1 assists a driver in eco-driving (eco-drive) by performing assistance in encouraging the driver to drive with a high fuel efficiency improving effect by utilizing the look-ahead information. The driving assistance device 1 typically guides/assists the driver to perform safe driving operation of the vehicle 2 with the ECU 20 controlling the HMI device 15 to present various pieces of driving assistance information to the driver of the vehicle 2 based on various conditions such as a travel state of the vehicle 2 and a peripheral travel environment in order to assist the driver in the eco-driving.

Especially, in this embodiment, when there is a stop point at which the vehicle 2 should stop in front of the vehicle 2 on a travel route, the driving assistance device 1 displays the driving assistance information for encouraging the driver to perform decelerating operation to stop the vehicle 2 at the stop point on the HMI device 15 in a service providing area (hereinafter, also represented as "place") set in a range before the stop point on the travel route. The decelerating operation as a target of the driving assistance includes accelerator off operation to release an accelerator pedal to decelerate by engine braking and brake on operation to depress a brake pedal to decelerate by a foot brake.

The driving assistance device 1 presents information to instruct the driver to perform the accelerator off operation to the driver as the driving assistance information and allows the driver to execute the accelerator off operation at appropriate timing (accelerator off timing) for the stop point. Then, this presents information to instruct the driver to perform the brake on operation to the driver at timing at which a vehicle speed substantially reaches a brake operation starting vehicle speed by the accelerator off operation. According to this, the vehicle 2 may smoothly stop in the vicinity of the stop point. In this manner, the driving assistance device 1 may provide appropriate driving assistance in which a sense of discomfort provided to the driver in the driving assistance is inhibited by outputting the driving assistance information such that the vehicle 2 appropriately stops at the stop point according to the various conditions.

Meanwhile, there may be an intersection, a crossing point, a T-junction, a point in front of a store entrance, a stop sign and the like, for example, as the stop point at which the vehicle 2 should stop.

The vehicle 2 on which the driving assistance device 1 is mounted is provided with any one of an engine, a motor and the like as a driving source for travel for rotary-driving a drive wheel. The vehicle 2 may be a vehicle of any type such as a hybrid vehicle provided with both the engine and motor, a conventional vehicle provided with the engine but without the motor, and an electric vehicle provided with the motor but without the engine.

The vehicle 2 includes various state detecting devices which detect various state amounts and physical amounts indicating a state of the vehicle 2, an operating state of switches and the like. The state detecting devices are electrically connected to the ECU 20 to output various signals to the ECU 20. In this embodiment, the state detecting device is configured to obtain travel resistance which the vehicle 2 receives from a travel road in the service providing area of the driving assistance and includes a database 11 (storing means), a GPS device 12, a car navigation device 13, and a wireless communication device 14 as illustrated in FIG. 1. Meanwhile, the term "travel resistance" used in this embodiment includes road surface resistance and gradient resistance which the vehicle 2 receives from the travel road while the vehicle 2 travels and is also referred to as "gradient/road surface resistance" in the following description.

The database 11 stores various pieces of information. The database 11 stores map information including road information, various pieces of information and learning information obtained through actual travel of the vehicle 2, the look-ahead information obtained by the wireless communication device 14 and the like. The database 11 is electrically connected to the ECU 20. The information stored in the database 11 is appropriately referred to by the ECU 20 and necessary information is read. Meanwhile, although the database 11 is herein illustrated to be mounted on the vehicle 2, there is no limitation, and this may also be provided on an information center and the like outside the vehicle 2 to be configured to be appropriately referred to by the ECU 20 through wireless communication and the like for reading of the necessary information.

In this embodiment, the database 11 accumulates the gradient/road surface resistance estimated by a gradient/road surface resistance estimating unit 24b to be described later when the vehicle 2 travels in the service providing area (represented as "place i" and the like in this embodiment) in association with the relevant service providing area as the learning information. That is to say, the database 11 stores past gradient/road surface resistance obtained through learning by the gradient/road surface resistance estimating unit 24b while the vehicle 2 travels.

The GPS device 12 is a device which detects a current position of the vehicle 2. The GPS device 12 receives a GPS signal output from a GPS satellite and positions/performs operation of GPS information including positional information and travel directional information of the vehicle 2 based on the received GPS signal. The GPS device 12 is electrically connected to the ECU 20 and outputs a signal regarding the GPS information to the ECU 20.

The car navigation device 13 is a device which guides the vehicle 2 to a predetermine destination. The car navigation device 13 detects a route to the destination from information stored in a map information database included therein, the GPS information obtained by the GPS device 12, and information of the destination input by the driver and the like and displays information of the detected route on a display unit. The map information database included in the car navigation device 13 stores statistic infrastructure information such as the map information including the road information. For example, the road information includes at least one of road gradient information, road surface condition information, road shape information, limiting vehicle speed information, road curvature (curve) information and the like. The road information stored in the map information database includes road linear information regarding a width of the road and the number of lanes and information indicating whether there is the stop line or the crossing. The car navigation device 13 is electrically connected to the ECU 20. The information stored in the car navigation device 13 is appropriately referred to by the ECU 20 and necessary information is read.

In this embodiment, in the map information database of the car navigation device 13, statistic information regarding the gradient/road surface resistance including the gradient resistance due to a road gradient and the road surface resistance due to a road surface condition such as paved/non-paved road are stored in association with each position on the map.

The wireless communication device 14 is a look-ahead information obtaining device which obtains the look-ahead information regarding the travel of the vehicle 2 by using the wireless communication. The wireless communication device 14 obtains the look-ahead information by using the wireless communication from a device and the like which communicates information by using communication infrastructure such as the Internet through a road-to-vehicle communication device (roadside device) such as an optical beacon installed on a roadside, an inter-vehicle communication device mounted on another vehicle, a VICS (registered trademark) (vehicle information and communication system) center and the like, for example. The wireless communication device 14 obtains preceding vehicle information, following vehicle information, traffic signal information, construction work/traffic regulation information, traffic jam information, emergency vehicle information, information regarding an accident history database and the like, for example, as the look-ahead information. The wireless communication device 14 is electrically connected to the ECU 20 and outputs a signal regarding the look-ahead information to the ECU 20.

In this embodiment, the wireless communication device 14 obtains information of the gradient/road surface resistance of the service providing area externally accumulated in the VICS center and the like in response to an instruction from the ECU 20 to output to the ECU 20. As the information of the gradient/road surface resistance externally accumulated, information obtained through travel of the own vehicle 2 and other vehicles is summarized.

The HMI device 15 is an assistance device capable of outputting the driving assistance information being the information to assist the driving of the vehicle 2, the device which provides the driving assistance information to the driver. The HMI device 15, which is an in-vehicle device, includes a display device (visual information display device), a speaker (audio information outputting device) and the like provided on a vehicle interior of the vehicle 2, for example. The HMI device 15 provides the driving assistance information to the driver by outputting visual information (graphic information and character information), audio information (voice information and sound information) and the like to guide the driving operation of the driver. The HMI device 15 assists realization of a target value by the driving operation of the driver by providing such information. The HMI device 15 is electrically connected to the ECU 20 to be controlled by the ECU 20. Meanwhile, an existing device such as a display device, a speaker and the like of a navigation system may be used as the HMI device 15, and this may include a tactile information outputting device and the like which outputs tactile information such as steering wheel oscillation, seat oscillation, and pedal reaction force, for example.

The ECU 20 is electrically connected to the state detecting devices such as the database 11, the GPS device 12, the car navigation device 13, and the wireless communication device 14 and controls each unit of the vehicle 2 based on various pieces of information input from the state detecting devices. Especially, in this embodiment, the ECU 20 performs the driving assistance for encouraging the driver of the vehicle 2 to perform the decelerating operation (accelerator off operation and brake on operation) according to an approaching degree of the vehicle 2 to the stop point in front of the same on the route while the vehicle 2 travels in the service providing area. Furthermore, the ECU 20 appropriately changes the accelerator off timing according to change in road surface condition and the like of the travel road to perform the driving assistance to the driver. The ECU 20 is configured to realize each function of a first information arithmetic unit 21, a second information arithmetic unit 22, a third information arithmetic unit 23, and a vehicle controller 24 as illustrated in FIG. 1 for the driving assistance.

The first information arithmetic unit 21, the second information arithmetic unit 22, and the third information arithmetic unit 23 are ITS (intelligent transport systems)-compliant arithmetic units, for example, the arithmetic units for performing infrastructure collaboration and NAVI collaboration. The vehicle controller 24 is a controller which controls each unit of the vehicle 2. The vehicle controller 24 is connected to actuator ECUs which control various actuators such as an engine control ECU, an MG control ECU, a transmission control ECU, a brake control ECU, and a battery control ECU and sensors through a CAN (control area network) 16 built as an in-vehicle network. The vehicle controller 24 obtains control values of the various actuators and detection values of the sensors as vehicle information through the CAN 16.

The first information arithmetic unit 21 outputs the gradient/road surface resistance stored by the learning of the own vehicle to the vehicle controller 24. The first information arithmetic unit 21 is configured to realize each function of a position locating unit 21a, a gradient/road surface resistance obtaining unit 21b, and an adder 21c. The position locating unit 21a obtains the GPS information through the GPS device 12 to obtain current positional information of the vehicle (own vehicle) 2. The current positional information includes information specifying the service providing area (information such as "place i" and "place i+1" to be described later). The position locating unit 21a outputs the current positional information to the adder 21c. The gradient/road surface resistance obtaining unit 21b obtains a stored value of the gradient/road surface resistance stored by the learning of the own vehicle with reference to the various pieces of information obtained through the actual travel of the vehicle 2 and the learning information stored in the database 11. The gradient/road surface resistance obtaining unit 21b outputs the obtained stored value of the gradient/ road surface resistance to the adder 21c. The adder 21c associates the gradient/road surface resistance obtained by the gradient/road surface resistance obtaining unit 21b with the current positional information obtained by the position locating unit 21a to output to an arbitrating unit 24a of the vehicle controller 24.

The second information arithmetic unit 22 outputs the statistic gradient/road surface resistance associated with the map information to the vehicle controller 24. The second information arithmetic unit 22 is configured to realize each function of a position locating unit 22a, a gradient/road surface resistance obtaining unit 22b, and an adder 22c. The position locating unit 22a obtains the GPS information through the GPS device 12 to obtain the current positional information of the vehicle (own vehicle) 2. The position locating unit 22a outputs the current positional information to the adder 22c. The gradient/road surface resistance obtaining unit 22b obtains the statistic information regarding the gradient/road surface resistance of the position stored in association with each position on the map in the map information database of the car navigation device 13. The gradient/road surface resistance obtaining unit 22b outputs a stored value of the obtained gradient/road surface resistance to the adder 22c. The adder 22c associates the gradient/road surface resistance obtained by the gradient/road surface resistance obtaining unit 22b with the current positional information obtained by the position locating unit 22a to output to the arbitrating unit 24a of the vehicle controller 24.

The third information arithmetic unit 23 outputs the gradient/road surface resistance accumulated through the travel of the own vehicle 2 and other vehicles to the vehicle controller 24. The third information arithmetic unit 23 is configured to realize each function of a position locating unit 23a, a gradient/road surface resistance obtaining unit 23b, and an adder 23c. The position locating unit 23a obtains the GPS information through the GPS device 12 to obtain the current positional information of the vehicle (own vehicle) 2. The position locating unit 23a outputs the current positional information to the adder 23c. The gradient/road surface resistance obtaining unit 23b obtains the information of the gradient/road surface resistance accumulated through the travel of the own vehicle and other vehicles accumulated in the external database such as the VICS center through the wireless communication device 14. The gradient/road surface resistance obtaining unit 23b outputs a stored value of the obtained gradient/road surface resistance to the adder 23c. The adder 23c associates the gradient/road surface resistance obtained by the gradient/road surface resistance obtaining unit 23b with the current positional information obtained by the position locating unit 23a to output to the arbitrating unit 24a of the vehicle controller 24.

The vehicle controller 24 comprehensively controls components of the HMI device 15 and the vehicle 2 based on the gradient/road surface resistance output by the first, second, and third information arithmetic units 21, 22, and 23 and the vehicle information obtained through the CAN 16. The vehicle controller 24 is configured to realize each function of the arbitrating unit 24a, the gradient/road surface resistance estimating unit 24b (resistance estimating means), a gradient/road surface resistance correcting unit 24c, and an accelerator off timing arithmetic unit 24d.

The arbitrating unit 24a is configured to arbitrate the information of the gradient/road surface resistance input from the adder 21c of the first information arithmetic unit 21, the adder 22c of the second information arithmetic unit 22, and the adder 23c of the third information arithmetic unit 23. The arbitrating unit 24a arbitrates resistance values based on accuracy, reliability, a magnitude relationship and the like of the resistance values, for example. As illustrated in FIG. 2, the arbitrating unit 24a outputs an arbitration result as a stored value $G_L$ of the gradient/road surface resistance to the gradient/road surface resistance correcting unit 24c together with the current positional information of the vehicle 2 associated with the stored value.

The gradient/road surface resistance estimating unit 24b estimates the gradient/road surface resistance of the travel road which the vehicle 2 travels based on current various conditions. The gradient/road surface resistance estimating unit 24b calculates an estimated value G of the gradient/road surface resistance by using following equation (1), for example, based on various pieces of vehicle information such as a current vehicle speed Vx and driving force of the vehicle 2 obtained through the CAN 16, for example.

$$G = Gx\_T - \Delta Vx - K \times Vx^2 \qquad (1)$$

Herein, Gx_T represents acceleration estimated from the driving force of the vehicle 2, $\Delta Vx$ represents the acceleration estimated from the vehicle speed, and K represents an air resistance coefficient. As illustrated in FIG. 2, the gradient/road surface resistance estimating unit 24b outputs the calculated estimated value G of the gradient/road surface resistance to the gradient/road surface resistance correcting unit 24c.

The gradient/road surface resistance correcting unit 24c calculates a corrected value $G_H$ of the gradient/road surface resistance by correcting the stored value $G_L$ based on the stored value $G_L$ of the gradient/road surface resistance input from the arbitrating unit 24a and the estimated value G of the gradient/road surface resistance input from the gradient/road surface resistance estimating unit 24b to output to the accelerator off timing arithmetic unit 24d. The gradient/road surface resistance correcting unit 24c corrects the gradient/road surface resistance in consideration of the resistance value which the vehicle receives according to difference in travel environment of the vehicle 2 (road surface condition such as dry/wet, wind speed, wind direction, vehicle weight, tire type, tire diameter and the like). The gradient/road surface resistance correcting unit 24c is configured to realize each function of a correction coefficient arithmetic unit 31 and a gradient/road surface resistance corrected value arithmetic unit 32 as illustrated in FIG. 2.

The correction coefficient arithmetic unit 31 updates a correction coefficient α used for correcting the stored value $G_L$ of the gradient/road surface resistance based on difference between the stored value $G_L$ of the gradient/road surface resistance input from the arbitrating unit 24a and the estimated value G of the gradient/road surface resistance input from the gradient/road surface resistance estimating unit 24b. A process of updating the correction coefficient is to be described later.

The gradient/road surface resistance corrected value arithmetic unit 32 calculates the corrected value $G_H$ of the gradient/road surface resistance by using the correction coefficient α updated by the correction coefficient arithmetic unit 31. The gradient/road surface resistance corrected value arithmetic unit 32 calculates the corrected value $G_H$ of the gradient/road surface resistance by multiplying the correction coefficient α by the stored value $G_L$ of the gradient/road surface resistance. An arithmetic process of the corrected value is also described later.

The accelerator off timing arithmetic unit 24d performs operation of the accelerator off timing based on the corrected value $G_H$ of the gradient/road surface resistance calculated by the gradient/road surface resistance correcting unit 24c.

The accelerator off timing is determined based on a relationship among deceleration a at the time of accelerator off travel of the vehicle 2, a vehicle speed $V_B$ at which brake deceleration is started, and a current vehicle speed $V_{now}$ of the vehicle 2. The deceleration a at the time of accelerator off may be calculated by subtracting various resistance components from engine braking deceleration. The accelerator off deceleration a may be calculated by using following equation (2), for example.

$$a = a_{ENG} - a_{Air} - a_{Slope} - a_{RL} \quad (2)$$

Herein, $a_{ENG}$ represents the engine braking deceleration, $a_{Air}$ represents air resistance, $a_{Slope}$ represents the road gradient resistance, and $a_{RL}$ represents rolling frictional resistance.

Among these resistance values, the road gradient resistance $a_{Slope}$ is a parameter varying according to the gradient/road surface resistance which the vehicle 2 receives during the travel. The accelerator off timing arithmetic unit 24d calculates the deceleration a at the time of the accelerator off travel by equation (2) described above by using the corrected value $G_H$ of the gradient/road surface resistance calculated by the gradient/road surface resistance corrected value arithmetic unit 32. Then, this determines the accelerator off timing based on the accelerator off deceleration. According to this, it is possible to obtain the deceleration matching the current travel state of the vehicle 2 with high accuracy and derive the accelerator off timing more suitable to the current travel.

The ECU 20 physically is an electronic circuit mainly formed of a well-known microcomputer including a CPU (central processing unit), a RAM (random access memory), a ROM (read only memory), an interface and the like. Functions of the ECU 20 described above are realized by loading an application program held in the ROM on the RAM to be executed by the CPU, thereby allowing various devices in the vehicle 2 to operate under control of the CPU, and reading/writing data from/in the RAM and ROM.

In this manner, the arbitrating unit 24a, the gradient/road surface resistance correcting unit 24c, and the gradient/road surface resistance estimating unit 24b of the ECU 20 and the database 11 among the components of the driving assistance device 1 act as the travel resistance arithmetic device according to this embodiment.

Operation of the travel resistance arithmetic device according to this embodiment is next described with reference to FIGS. 3 and 4.

A summary of a correcting process of the travel resistance is first described with reference to FIG. 3. FIG. 3 is a schematic diagram illustrating a relationship between the service providing area (places i and i+1) of the driving assistance and the gradient/road surface resistances G and $G_L$ in the first embodiment. In FIG. 3, a travel distance of the vehicle 2 is plotted along the abscissa and a travel direction of the vehicle 2 is from left to right of the drawing. In FIG. 3, the gradient/road surface resistance in each position on the travel road of the vehicle 2 is plotted along the ordinate.

Figure 3:
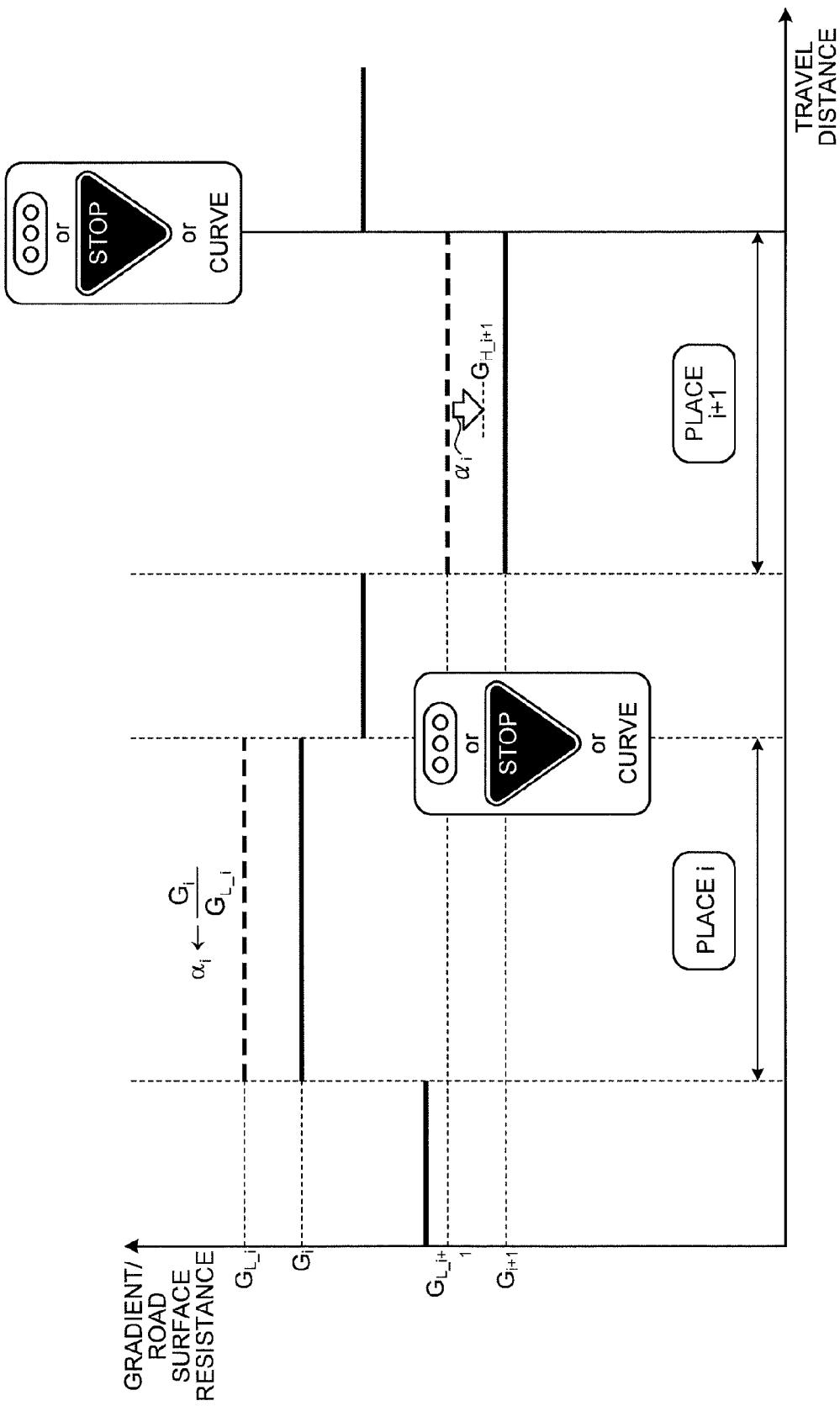
FIG. 3 is a schematic diagram illustrating a relationship between a service providing area of driving assistance and gradient/road surface resistance in the first embodiment.
Figure 4:
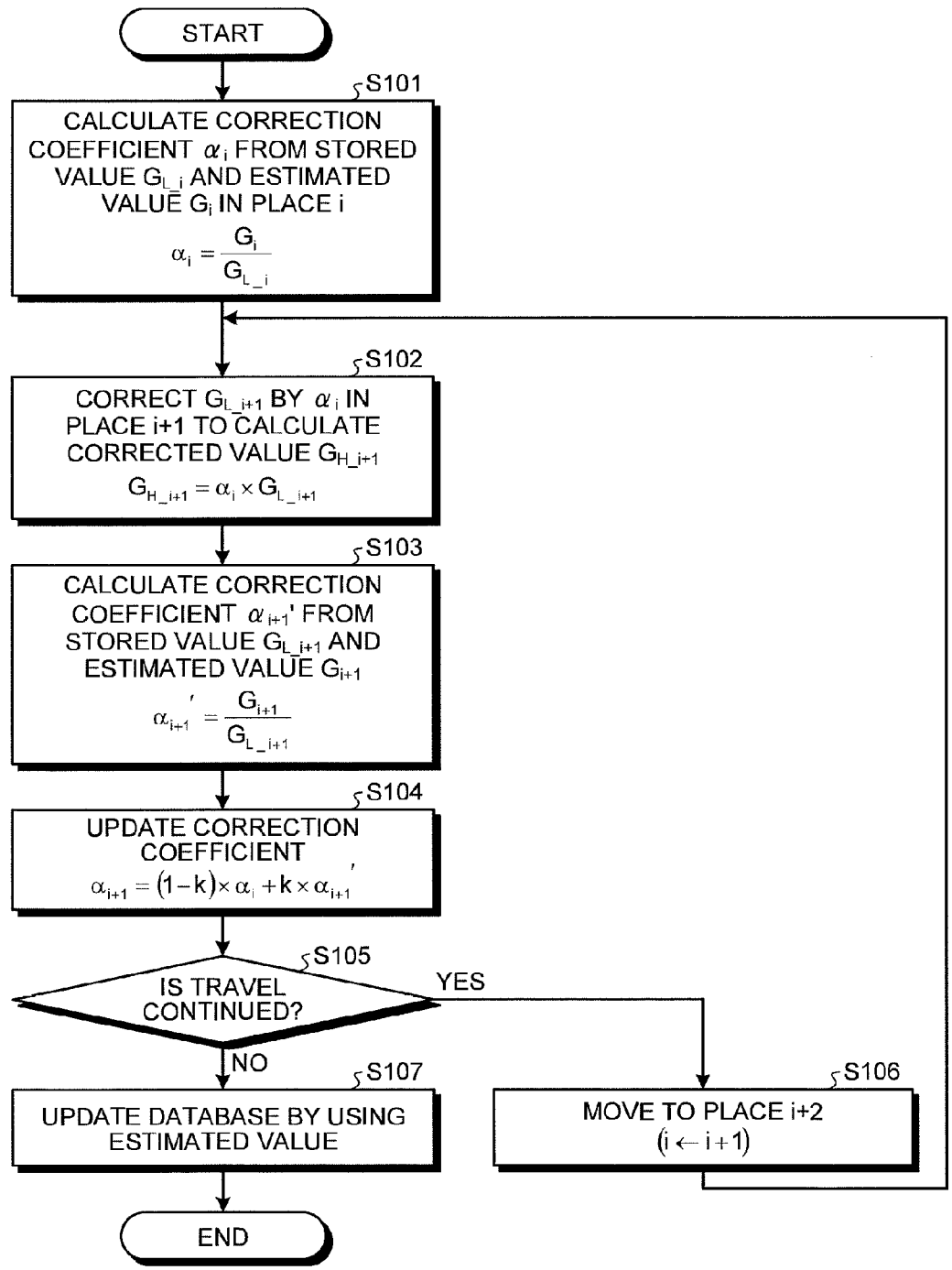
FIG. 4 is a flowchart illustrating a travel resistance correcting process performed by the driving assistance device to which the travel resistance arithmetic device according to the first embodiment is applied.

As illustrated in FIG. 3, during one driving travel of the vehicle 2, an arbitrary i-th service providing area of the driving assistance which the vehicle 2 encounters on the travel route is represented as "place i" and a next i+1-th area is represented as "place i+1". In FIG. 3, the estimated value G of the gradient/road surface resistance sequentially estimated by the gradient/road surface resistance estimating unit 24b is indicated by a solid line. In the following description, the estimated value G of the gradient/road surface resistance estimated in the place i is represented as $G_i$ and that estimated in the place i+1 is represented as $G_{i+1}$. As described above, in each service providing area, the stored value $G_L$ of the gradient/road surface resistance is stored in the database 11 and the like based on a previous travel history. In the following description, the stored value $G_L$ of the gradient/road surface resistance of the place i is represented as $G_{L\_i}$ and that of the place i+1 is represented as $G_{L\_i+1}$. $G_{L\_i}$ and $G_{L\_i+1}$ are indicated by dotted lines in FIG. 3.

As illustrated in FIG. 3, the stored value $G_L$ of the gradient/road surface resistance in each service providing area is obtained during past travel, so that this is based on a past travel environment of when the information is obtained. A past travel environment condition is not necessarily the same as a current travel environment condition, so that the stored value $G_L$ might differ from the estimated value G obtained based on the current travel environment condition according to difference between them. Therefore, it is desirable to appropriately correct the known stored value $G_L$ to output a value close to actual gradient/road surface resistance as far as possible.

Therefore, the driving assistance device 1 of this embodiment is configured to set the correction coefficient α based on the difference (ratio in this embodiment) between the stored value $G_L$ and the estimated value G of the gradient road surface resistance and multiply the correction coefficient α by the stored value $G_L$, thereby correcting the gradient/road surface resistance to output.

However, the estimated value G of the gradient/road surface resistance may be derived based on the vehicle information such as the vehicle speed and the driving force of an entire area after the travel in the service providing area, so that this is the information which cannot be provided in real time during the travel in this area. Therefore, it is difficult to set the correction coefficient according to the current gradient/road surface resistance of this area while the vehicle 2 travels in a certain service providing area.

Therefore, the driving assistance device 1 of this embodiment obtains a correction coefficient $α_i$ based on the difference between the stored value $G_{L\_i}$ and the estimated value $G_i$ in an arbitrary place i (predetermined area) during the travel and uses the correction coefficient $α_i$ for correcting the gradient/road surface resistance in the place i+1 (correction target area) in which the vehicle 2 travels next. That is to say, when the estimated value $G_i$ of the gradient/road surface resistance of the arbitrary place i is calculated by the gradient/road surface resistance estimating unit 24b, the correction coefficient $α_i$ used for correction operation of the travel resistance is updated based on the ratio $(G_i/G_{L\_i})$ between the calculated estimated value $G_i$ and the stored value $G_{L\_i}$ of the place i. The driving assistance device 1 performs the correction operation of the travel resistance by using the correction coefficient $α_i$ in the place i+1 which the vehicle 2 encounters next. That is to say, this multiplies the correction coefficient $α_i$ updated in the place i by the stored value $G_{L\_i+1}$ of the gradient/road surface resistance in the place i+1 to calculate a corrected value $G_{H\_i+1}$.

The correcting process of the travel resistance is next described in detail with reference to FIG. 4. FIG. 4 is a flowchart illustrating the travel resistance correcting process performed by the driving assistance device to which the travel resistance arithmetic device according to the first embodiment is applied. A control flow illustrated in the flowchart in FIG. 4 is executed when the vehicle 2 travels in an arbitrary i-th service providing area (place i) during the driving travel.

At step S101, the correction coefficient arithmetic unit 31 calculates the correction coefficient $\alpha_i$ of the gradient/road surface resistance in the place i. The correction coefficient arithmetic unit 31 calculates the correction coefficient $\alpha_i$ by using following equation (3) based on the estimated value $G_i$ of the gradient/road surface resistance and the stored value $G_{L\_i}$ in the place i.

$$\alpha_i = G_i/G_{L\_i} \tag{3}$$

Herein, the estimated value $G_i$ of the gradient/road surface resistance in the place i is calculated by the gradient/road surface resistance estimating unit 24b. The gradient/road surface resistance estimating unit 24b calculates the estimated value $G_i$ by using equation (1) described above based on the various pieces of vehicle information such as the vehicle speed Vx and the driving force of the vehicle 2 obtained through the CAN 16 while the vehicle travels in the place i.

The stored value $G_{L\_i}$ of the gradient/road surface resistance in the place i is a value derived from the arbitration result by the arbitrating unit 24a by using the learning information stored in the database 11, the statistic information associated with the map of the car navigation device 13, and the travel history information of other vehicles obtained from the external VICS center through the wireless communication device 14. When the process at step S101 is completed, the procedure shifts to step S102.

At step S102, the gradient/road surface resistance corrected value arithmetic unit 32 corrects the stored value $G_{L\_i+1}$ of the gradient/road surface resistance in the place i+1 by using the correction coefficient $\alpha_i$ of the place i and calculates the corrected value $G_{H\_i+1}$ of the gradient/road surface resistance in the place i+1. The gradient/road surface resistance corrected value arithmetic unit 32 calculates the corrected value $G_{H\_i+1}$ of the gradient/road surface resistance in the place i+1 by using following equation (4), for example.

$$G_{H\_i+1} = \alpha_i \times G_{L\_i+1} \tag{4}$$

Herein, the stored value $G_{L\_i+1}$ of the gradient road surface resistance in the place i+1 is input from the arbitrating unit 24a.

The gradient/road surface resistance correcting unit 24c outputs the corrected value $G_{H\_i+1}$ of the gradient/road surface resistance calculated by the gradient/road surface resistance corrected value arithmetic unit 32 to the accelerator off timing arithmetic unit 24d. The accelerator off timing arithmetic unit 24d calculates the current accelerator off deceleration a of the vehicle 2 by using equation (2) described above based on the input corrected value $G_{H\_i+1}$ of the gradient/road surface resistance and calculates the accelerator off timing when the vehicle 2 travels in the place i+1 based on the deceleration. The HMI device 15 instructs the driver of the accelerator off timing based on the calculated accelerator off timing. When the process at step S102 is completed, the procedure shifts to step S103.

At step S103, the correction coefficient arithmetic unit 31 calculates a correction coefficient $\alpha_{i+1}'$ of the gradient/road surface resistance based on a travel result in the place i+1 by the vehicle 2. The correction coefficient arithmetic unit 31 calculates the correction coefficient $\alpha_{i+1}'$ by following equation (5) based on the estimated value $G_{i+1}$ of the gradient/road surface resistance in the place i+1 and the stored value $G_{L\_i+1}$ in the place i+1.

$$\alpha_{i+1}' = G_{i+1}/G_{L\_i+1} \tag{5}$$

Herein, the estimated value $G_{i+1}$ of the gradient/road surface resistance in the place i+1 is calculated by the gradient/road surface resistance estimating unit 24b by using equation (1) described above based on the various pieces of vehicle information such as the vehicle speed Vx and the driving force of the vehicle 2 obtained through the CAN 16 while the vehicle 2 travels in the place i+1. The stored value $G_{L\_i+1}$ is the value input from the arbitrating unit 24a at step S102. When the process at step S103 is completed, the procedure shifts to step S104.

At step S104, the correction coefficient arithmetic unit 31 updates the correction coefficient $\alpha_i$ to $\alpha_{i+1}$. The updated correction coefficient $\alpha_{i+1}$ is used for correcting the road surface resistance in a place i+2 where the vehicle 2 travels next. In further detail, this updates the correction coefficient $\alpha_i$ used for correcting the road surface resistance during the travel in the place i+1 at step S102 by using the correction coefficient $\alpha_{i+1}'$ based on the travel in the place i+1 calculated at step S103. Specifically, a weighted average of $\alpha_{i+1}'$ and $\alpha_i$ is obtained. The correction coefficient is updated by using following equation (6), for example.

$$\alpha_{i+1} = (1-k) \times \alpha_i + k \times \alpha_{i+1}' \tag{6}$$

Herein, k represents an arbitrary weight coefficient. When the process at step S104 is completed, the procedure shifts to step S105.

At step S105, it is confirmed whether the travel of the vehicle 2 is continued. When the travel of the vehicle 2 is continued (Yes at step S105), the vehicle 2 moves to the next place i+2 on the travel route (step S106), the procedure returns to step S102, and the processes at steps S102 to S104 are repeated after "i+1" is substituted for a sign "i". In a case of a first loop, for example, at step S102, the gradient/road surface resistance corrected value arithmetic unit 32 calculates a corrected value $G_{H\_i+2}$ of the gradient/road surface resistance in the place i+2 by multiplying the correction coefficient $\alpha_{i+1}$ updated at step S104 in a previous loop by a stored value $G_{L\_i+2}$ of the road surface resistance in the place i+2. In a case of a second loop, a corrected value $G_{H\_i+3}$ of the gradient/road surface resistance in a place i+3 is calculated by multiplying a correction coefficient $\alpha_{i+2}$ updated at step S104 in the previous loop by a stored value $G_{L\_i+3}$ of the road surface resistance in the place i+3.

In contrast, when the travel of the vehicle 2 is finished (No at step S105), the database 11 is updated by using the estimated value $G_i$ of the gradient/road surface resistance estimated for each place traveled in the current travel (step S107). When updating the database, it is possible to overwrite the database 11 with the currently obtained estimated value $G_i$ as a new stored value $G_{L\_i}$ or set a new stored value by obtaining the weighted average of the same and the current stored value, for example. When the process at step S107 is completed, this control flow is finished.

Meanwhile, when the correction coefficient is updated at a point before the place i, the correction coefficient $\alpha_i$ in the place i calculated at step S101 may be updated by using also the correction coefficient derived at the point before the place i as at step S104. For example, when a previous service providing area of the place i is set a place i−1, it is also possible to calculate the correction coefficient $\alpha_i$ by using following equation (7), for example, at step S101.

$$\alpha_i = (1-k) \times \alpha_{i-1} + k \times (G_i/G_{L\_i}) \tag{7}$$

Herein, $\alpha_{i-1}$ represents the correction coefficient updated in the place i−1 and is updated based on $G_{i-1}/G_{L\_i-1}$.

Next, an effect of the travel resistance arithmetic device according to this embodiment is described.

The driving assistance device 1 to which the travel resistance arithmetic device according to this embodiment is applied is provided with the gradient/road surface resistance estimating unit 24b which estimates the gradient/road surface resistance (travel resistance) G which the vehicle 2 receives from the travel road and the database 11 which associates the gradient/road surface resistance with the positional information to store as the stored value $G_L$ of the gradient/road surface resistance. The gradient/road surface resistance correcting unit 24c of the driving assistance device 1 corrects the stored value $G_{L\_i+2}$ of the gradient/road surface resistance stored in the database 11 in association with the service providing area (correction target area, for example, place i+2) being the correction target on the travel path based on the ratio ($G_{i+1}/G_{L\_i+1}$) between the stored value $G_{L\_i+1}$ of the gradient/road surface resistance stored in the database in association with a predetermined service providing area (predetermined area, for example, place i+1) on the travel road through which the vehicle 2 has already passed and the estimated value $G_{H\_i+2}$ of the gradient/road surface resistance estimated by the gradient/road surface resistance estimating unit 24b in the place i+1 while the vehicle 2 travels the travel road and outputs the same as the corrected value $G_{H\_i+2}$ of the gradient/road surface resistance in the place i+2.

By this configuration, the gradient/road surface resistance is corrected according to the ratio between the stored value $G_L$ of the gradient/road surface resistance based on the past travel history of the own vehicle 2 and the estimated value G of the gradient/road surface resistance estimated during the current travel, that is to say, a degree of difference between them, so that it is possible to adjust such that the output gradient/road surface resistance becomes closer to actual one by reflecting an effect of disturbance such as a weather condition during the travel, for example. Since the gradient/road surface resistance of the correction target area is corrected based on the difference between the stored value $G_L$ and the estimated value G of the gradient/road surface resistance of the predetermined area through which the vehicle has already passed, it becomes possible to correct the gradient/road surface resistance in real time in consideration of the effect of the previous disturbance to output when the vehicle 2 enters the correction target area. According to this, it is possible to inhibit the gradient/road surface resistance output during the vehicle travel from differing from the actual gradient/road surface resistance, and it is possible to estimate the gradient/road surface resistance with high accuracy. As a result, it is possible to derive more appropriate accelerator off timing by using the gradient/road surface resistance estimated with high accuracy, so that it becomes possible to appropriately perform the driving assistance of the accelerator off operation.

The gradient/road surface resistance correcting unit 24c of the driving assistance device 1 corrects the stored value $G_{L\_i+2}$ stored in the database 11 in association with the correction target area (place i+2) in further consideration of the ratio ($G_i/G_{L\_i}$) between the stored value $G_{L\_i}$ and the estimated value $G_i$ of the gradient/road surface resistance in a past predetermined area (for example, place i) through which the vehicle 2 passes before the predetermined area (place i+1) on the travel road and outputs the same as the corrected value $G_{H\_i+2}$ of the gradient/road surface resistance at the point i+2. In more detail, as represented by equation (6) described above, the correction coefficient $\alpha_{i+1}$ used for correcting in the place i+2 is the weighted average of the correction coefficient $\alpha_i$ in the place i calculated by equation (3) and the correction coefficient $\alpha_{i+1}'$ in the place i+1 calculated by equation (5).

By this configuration, it is possible to correct the gradient/road surface resistance in consideration of not only the difference between the stored value and the estimated value of the gradient/road surface resistance in the predetermined area but also the difference between them in the past predetermined area, so that it becomes possible to obtain more information for recognizing the effect of the current disturbance. It becomes possible to reflect the effect of the disturbance to the correction of the gradient/road surface resistance more accurately based on the information and to improve estimation accuracy of the gradient/road surface resistance.

In the driving assistance device 1, the database 11 stores the estimated value G of the gradient/road surface resistance estimated by the gradient/road surface resistance estimating unit 24b as the stored value $G_L$.

By this configuration, the stored value $G_L$ of the gradient/road surface resistance stored in the database 11 may be sequentially updated by using the estimated value G of the gradient/road surface resistance, so that it is possible to accumulate the stored value $G_L$ of the gradient/road surface resistance in the database 11 as the information of the gradient/road surface resistance based on the past travel history of the own vehicle.

The gradient/road surface resistance correcting unit 24c of the driving assistance device 1 corrects based on the ratio between the travel resistance information (stored value $G_{L\_i}$ of gradient/resistance) obtained by arbitrating the travel resistance information based on the travel history of the own vehicle stored in the database 11, geographical information stored in the map information of the car navigation device 13, and the travel resistance information based on the travel history of other vehicles externally obtained through the wireless communication device 14 and the estimated value $G_i$ of the gradient/road surface resistance estimated by the gradient/road surface resistance estimating unit 24b in the predetermined area.

By this configuration, it is possible to extract an appropriate stored value $G_{L\_i}$ of the gradient/road surface resistance from a plurality of information sources including the travel history of the own vehicle and other vehicles and the map information to use for correcting the travel resistance, so that highly reliable information may be obtained. By using the travel resistance information $G_{L\_i}$, obtained by this, it is possible to improve the accuracy in correcting the travel resistance and deriving the accelerator off timing, so that the driving assistance may be more appropriately performed.

Variation of First Embodiment

Figure 5:
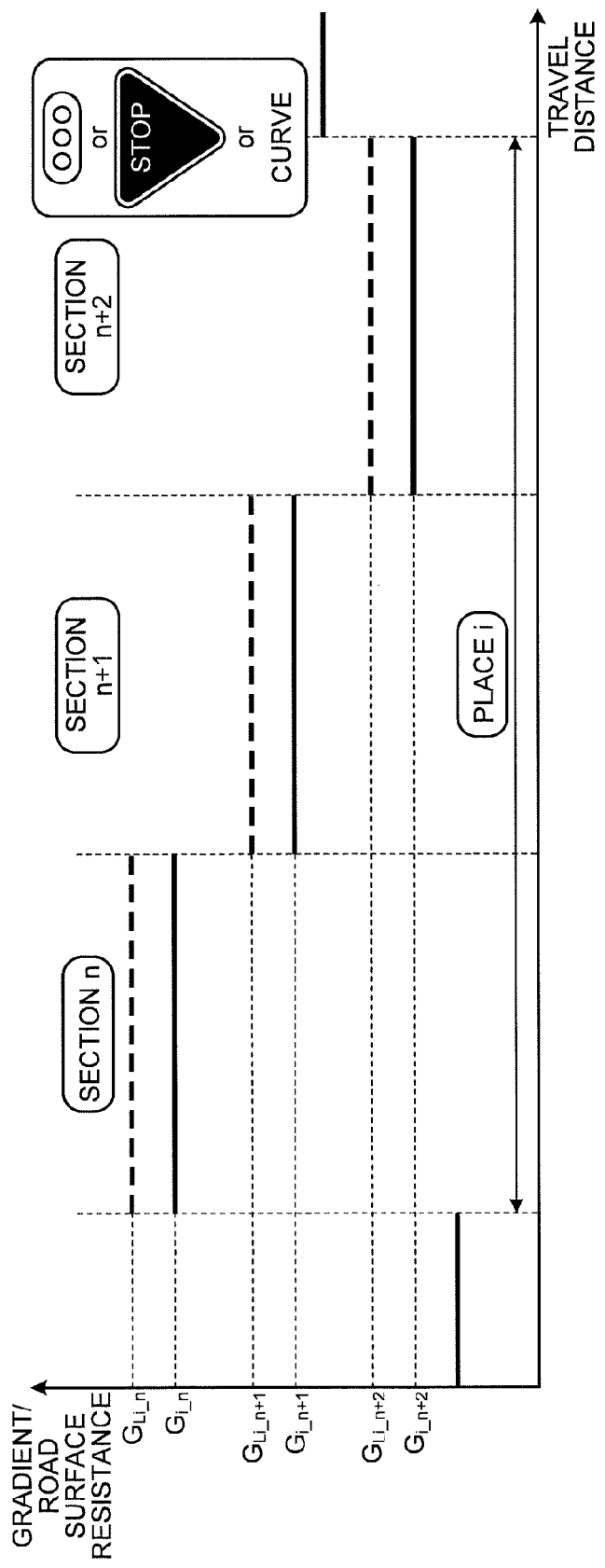
FIG. 5 is a schematic diagram illustrating a relationship between a service providing area of driving assistance and gradient/road surface resistance in a variation of the first embodiment.

A variation of a first embodiment is next described with reference to FIG. 5. FIG. 5 is a schematic diagram illustrating a relationship between a service providing area of driving assistance and gradient/road surface resistance in the variation of the first embodiment.

Although a configuration in which the gradient/road surface resistance is corrected for each arbitrary service area specified by "place i" and "place i+1" is illustrated in the above-described first embodiment, a unit of correction of the gradient/road surface resistance may be more finely segmented. For example, a configuration in which one service providing area is divided into a plurality of sections and the gradient/road surface resistance is corrected in each section is also possible as illustrated in FIG. 5. That is to say, a correction coefficient is obtained based on difference between a stored value and an estimated value in an arbitrary section n (predetermined area) in the service providing area and the correction coefficient is used for correcting travel resistance in a next section n+1 (correction target area).

As illustrated in FIG. 5, a plurality of sections n, n+1, and n+2 in one service providing area specified by the place i is considered.

When an estimated value $G_{i\_n}$ of the gradient/road surface resistance of the arbitrary section n is calculated by a gradient/road surface resistance estimating unit 24b, a correction coefficient α used for correction operation of a resistance value is updated based on a ratio between the calculated estimated value $G_{i\_n}$ and a stored value $G_{Li\_n}$ of the section n. The correction coefficient updated at that time is represented as $\alpha_{i\_n}$. A driving assistance device 1 calculates a corrected value $G_{H\_i\_n+1}$ by multiplying the correction coefficient $\alpha_{i\_n}$ updated in the section n by a stored value $G_{Li\_n+1}$ of the gradient/road surface resistance in the section n+1 in the section n+1 through which the vehicle 2 passes next.

Furthermore, when an estimated value $G_{i\_n+1}$ of the gradient/road surface resistance of the section n+1 is calculated by the gradient/road surface resistance estimating unit 24b, the correction coefficient α used for the correction operation of the resistance value is updated based on the ratio between the calculated estimated value $G_{i\_n+1}$ and the stored value $G_{Li\_n+1}$ of the section n to be output as $\alpha_{i\_n+1}$. The driving assistance device 1 calculates a corrected value $G_{H\_i\_n+2}$ by multiplying the correction coefficient $\alpha_{i\_n+1}$ updated in the section n by a stored value $G_{Li\_n+2}$ of the gradient/road surface resistance in the section n+2 in the section n+2 through which the vehicle 2 passes next.

Second Embodiment

Figure 6:
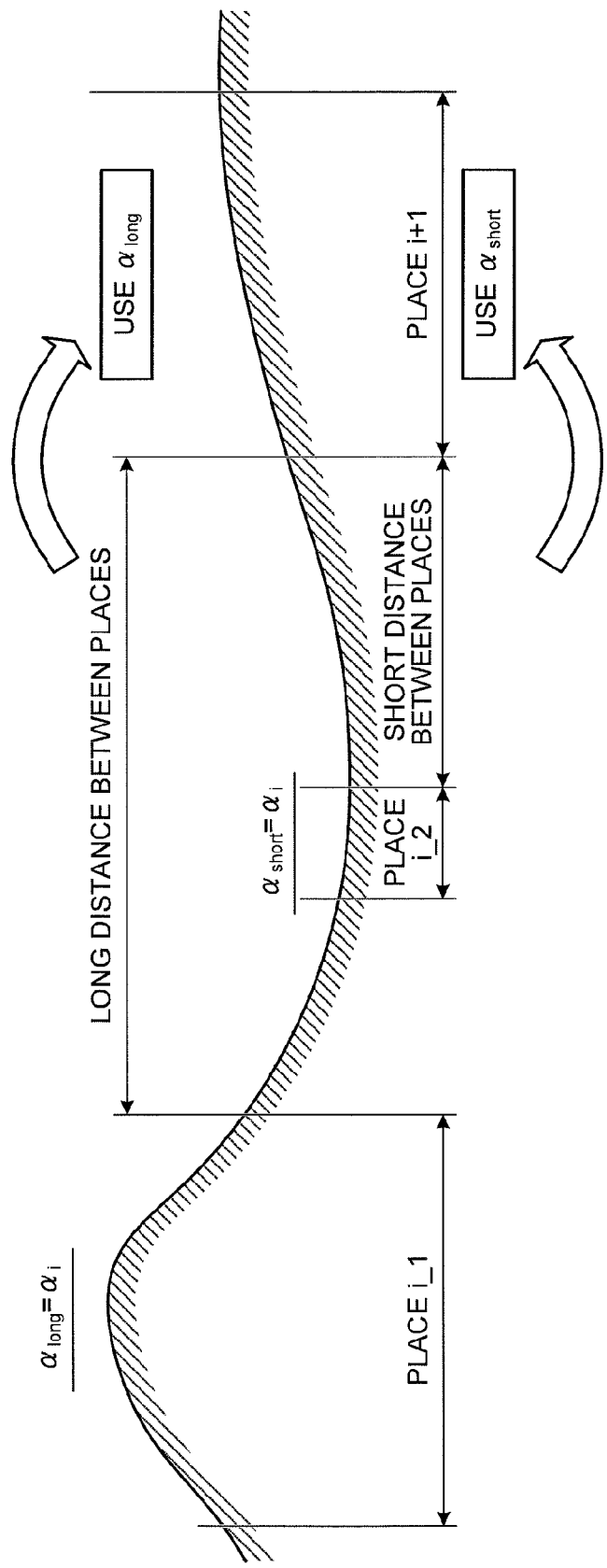
FIG. 6 is a schematic diagram illustrating a summary of a correcting process of travel resistance in a second embodiment.

A second embodiment is next described with reference to FIGS. 6 to 8. The second embodiment is different from a first embodiment in that a method of correcting a stored value $G_L$ is changed according to a degree of separation between a service providing area (correction target area) to be corrected on a travel road of a vehicle 2 and a previous service providing area through which the vehicle 2 has already passed.

A summary of a correcting process of travel resistance in the second embodiment is first described with reference to FIG. 6. FIG. 6 is a schematic diagram illustrating the summary of the correcting process of the travel resistance in the second embodiment.

In the first embodiment, when the vehicle 2 travels in an arbitrary place i on the travel road, a correction coefficient $\alpha_i$ is updated based on a ratio between an estimated value $G_i$ of gradient/road surface resistance regarding an entire place i and a stored value $G_{L\_i}$ of the gradient/road surface resistance stored in association with the place i. That is to say, the correction coefficient $\alpha_i$ is affected by the estimated value $G_i$ of the gradient/road surface resistance sequentially varying each time the vehicle 2 passes through the place i.

Herein, since the estimated value $G_i$ of the gradient/road surface resistance of the arbitrary place i relates to an entire area, a characteristic might differ according to travel time required for the vehicle 2 to pass through the area and a distance length of the area, so that the correction coefficient $\alpha_i$ calculated based on the estimated value $G_i$ also has a different characteristic. For example, the correction coefficient obtained from long-time travel has high robustness against change in the gradient/road surface resistance due to a vehicular cause such as a vehicle weight, a tire type, and a tire diameter which are less likely to change in a short time. In contrast, the correction coefficient obtained from short-time travel has the high robustness against the change in the gradient/road surface resistance due to an environmental cause such as a road surface condition, a wind speed, and a wind direction which easily changes in a short time.

Therefore, the second embodiment is configured to be able to optimize a corrected value of the gradient/road surface resistance by switching the correction coefficient to be used in the correction based on a relationship between the service providing area which is the correction target and a place where the correction coefficient is calculated, that is to say, the previous service providing area through which the vehicle 2 passes in consideration of difference between robust characteristics of the correction coefficients. Specifically, two types of correction coefficients which are $\alpha_{long}$ for the long-time travel and $\alpha_{short}$ for the short-time travel are set and the correction coefficient to be updated is selected according to the distance length of the service providing area. That is to say, as illustrated in FIG. 6, when the distance length of the service providing area is relatively long (indicated as place i_1 in FIG. 6), the correction coefficient $\alpha_{long}$ for the long-time travel is updated, and when the distance length is relatively short (indicated as place i_2 in FIG. 6), the correction coefficient $\alpha_{short}$ for the short-time travel is updated.

Then, the correction coefficient used for the correction is selected from the two types which are $\alpha_{long}$ for the long-time travel and $\alpha_{short}$ for the short-time travel to be used according to the degree of separation between the service providing area in which the gradient/road surface resistance is corrected and the previous service providing area. As illustrated in FIG. 6, when there is a long distance between both areas (case of place i_1 and place i+1 illustrated in FIG. 6), the correction coefficient $\alpha_{long}$ for the long-time travel with the high robustness against the change in the gradient/road surface resistance due to the vehicular cause which is less likely to vary in a short time is selected. In contrast, when the both areas are close to each other (case of place i_2 and place i+1 illustrated in FIG. 6), the correction coefficient $\alpha_{short}$ for the short-time travel with the high robustness against the change in the gradient/road surface resistance due to the environmental cause which easily varies in a short time is selected. Meanwhile, the degree of separation is required time for movement between the areas and a distance therebetween, for example, and a remote state and an adjacent state are distinguished from each other according to a relationship between the values and thresholds in this embodiment.

Figure 7:
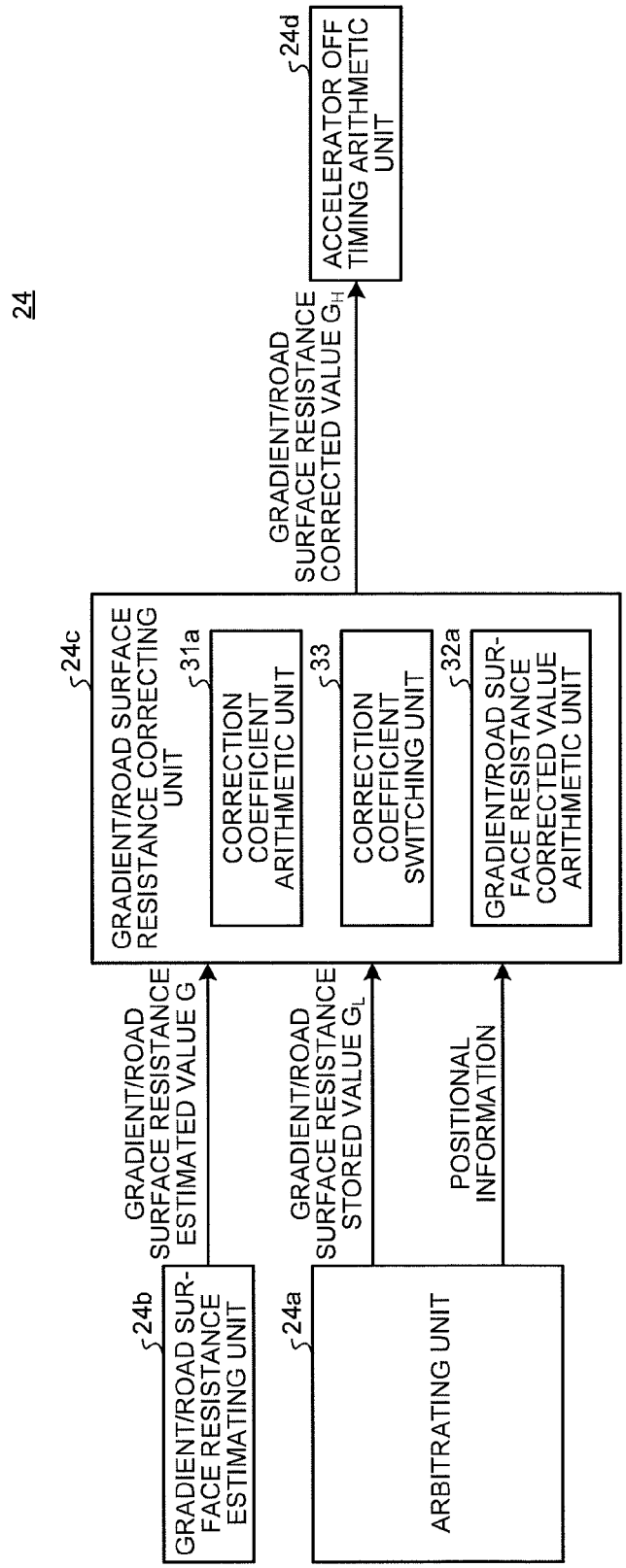
FIG. 7 is a functional block diagram illustrating a function of a gradient/road surface resistance correcting unit in the second embodiment in detail.

FIG. 7 is a functional block diagram illustrating a function of a gradient/road surface resistance correcting unit 24c in the second embodiment in detail. As illustrated in FIG. 7, the gradient/road surface resistance correcting unit 24c of this embodiment is configured to realize each function of a correction coefficient arithmetic unit 31a, a correction coefficient switching unit 33, and a gradient/road surface resistance corrected value arithmetic unit 32a.

The correction coefficient arithmetic unit 31a is different from a correction coefficient arithmetic unit 31 of the first embodiment in that this changes the correction coefficient to be updated according to the distance length of the service providing area in which the gradient/road surface resistance is corrected. A process of updating the correction coefficient is to be described later.

The correction coefficient switching unit 33 switches the correction coefficient used for correcting the gradient/road surface resistance according to the degree of separation between the service providing area in which the gradient/road surface resistance is corrected and the service providing area in which the correction is performed before this. The correction coefficient switching unit 33 outputs information of the selected correction coefficient to the gradient/road surface resistance corrected value arithmetic unit 32a.

The gradient/road surface resistance corrected value arithmetic unit 32a calculates a corrected value $G_H$ of the gradient/road surface resistance by using the correction coefficient selected by the correction coefficient switching unit 33.

Operation of a travel resistance arithmetic device according to the second embodiment is next described with reference to FIG. 8. FIG. 8 is a flowchart illustrating the travel resistance correcting process performed by a driving assistance device to which the travel resistance arithmetic device according to the second embodiment is applied.

At step S201, the correction coefficient arithmetic unit 31a calculates the correction coefficient $\alpha_i$ of the gradient/road surface resistance in the place i. Meanwhile, the process at this step is the same as that at step S101 in a flowchart in FIG. 4, so that the description thereof is omitted. When the process at step S201 is completed, the procedure shifts to step S202.

At step S202, the correction coefficient arithmetic unit 31a determines whether the travel time in the place i of the vehicle 2 is not shorter than predetermined threshold T (sec) after the vehicle 2 passes through the place i. As a result of the determination at step S202, when the travel time in the place i of the vehicle 2 is not shorter than the threshold T (Yes at step S202), the correction coefficient arithmetic unit 31a stores the correction coefficient $\alpha_i$ in the place i calculated at step S201 as the correction coefficient $\alpha_{long}$ for the long-time travel supposing that the place i is the service providing area requiring the long-time travel (step S203).

In contrast, when the travel time in the place i of the vehicle 2 is shorter than the threshold T (No at step S202), the correction coefficient arithmetic unit 31a stores the correction coefficient $\alpha_i$ of the place i calculated at step S201 as the correction coefficient $\alpha_{short}$ for the short-time travel supposing that the place i is the service providing area requiring the short-time travel (step S204). When the process at step S203 or S204 is completed, the procedure shifts to step S205.

Processes at step S205 and subsequent steps are performed after the vehicle recognizes the place i+1 in front of the same on a travel route.

At step S205, the correction coefficient switching unit 33 determines whether the distance between the place i and the place i+1 being the service providing areas is not shorter than predetermined threshold D (m). The correction coefficient switching unit 33 may obtain the distance between the places i and i+1 with reference to map information of a car navigation device 13 and the like, for example. As a result of the determination at step S205, when the distance between the place i and the place i+1 is not shorter than the predetermined threshold D (m) (Yes at step S205), the procedure shifts to step S206, and otherwise (No at step S205), the procedure shifts to step S207.

At step S206, since the distance between the place i and the place i+1 is not shorter than the predetermined threshold D (m) at step S205, the correction coefficient switching unit 33 selects the correction coefficient $\alpha_{long}$ for the long-time travel with the high robustness against change in resistance value due to the vehicular cause. Then, the gradient/road surface resistance corrected value arithmetic unit 32a calculates a gradient/road surface resistance $G_{H\_i+1}$ in the place i+1 by using the selected correction coefficient. The gradient/road surface resistance corrected value arithmetic unit 32a calculates the gradient/road surface resistance $G_{H\_i+1}$ in the place i+1 by following equation (8), for example.

$$G_{H\_i+1} = \alpha_{long} \times G_{L\_i+1} \quad (8)$$

When the process at step S206 is completed, the procedure shifts to step S208.

At step S207, since the distance between the place i and the place i+1 is shorter than the predetermined threshold D (m) at step S205, the correction coefficient switching unit 33 selects the correction coefficient $\alpha_{short}$ for the short-time travel with the high robustness against the change in the resistance value due to the environmental cause. Then, the gradient/road surface resistance corrected value arithmetic unit 32a calculates a gradient/road surface resistance $G_{H\_i+1}$ in the place i+1 by using the selected correction coefficient. The gradient/road surface resistance corrected value arithmetic unit 32a calculates the gradient/road surface resistance $G_{H\_i+1}$ in the place i+1 by following equation (9), for example.

$$G_{H\_i+1} = \alpha_{short} \times G_{L\_i+1} \quad (9)$$

When the process at step S207 is completed, the procedure shifts to step S208.

At step S208, the correction coefficient arithmetic unit 31a calculates a correction coefficient $\alpha_{i+1}$ of the gradient/road surface resistance in the place i+1. The correction coefficient arithmetic unit 31a calculates the correction coefficient $\alpha_{i+1}$ by following equation (10) based on an estimated value $G_{L\_i+1}$ and a stored value $G_{i+1}$ of the gradient/road surface resistance in the place i+1.

$$\alpha_{i+1} = G_{i+1} / G_{L\_i+1} \quad (10)$$

When the process at step S208 is completed, the procedure shifts to step S209.

At step S209, the correction coefficient arithmetic unit 31a determines whether the travel time in the place i+1 of the vehicle 2 is not shorter than the predetermined threshold T (sec). As a result of the determination at step S209, when the travel time in the place i+1 is not shorter than the threshold T (Yes at step S209), the procedure shifts to step S210, and otherwise (No at step S209), the procedure shifts to step S211.

At step S210, since the travel time in the place i+1 is not shorter than the threshold T at step S209, the correction coefficient arithmetic unit 31a updates the correction coefficient $\alpha_{long}$ for the long-time travel by using the correction coefficient $\alpha_{i+1}$ of the place i+1 calculated at step S208 supposing that the place i+1 is the service providing area requiring the long-time travel. The correction coefficient arithmetic unit 31a obtains a weighted average of $\alpha_{i+1}$ and $\alpha_{long}$ by using following equation (11), for example, to update the correction coefficient.

$$\alpha_{long} = (1-k) \times \alpha_{long} + k \times \alpha_{i+1} \quad (11)$$

When the process at step S210 is completed, the procedure shifts to step S212.

At step S211, since the travel time in the place i+1 is shorter than the threshold T at step S209, the correction coefficient arithmetic unit 31a updates the correction coefficient $\alpha_{short}$ for the short-time travel by using the correction coefficient $\alpha_{i+1}$ of the place i+1 calculated at step S208 supposing that the place i+1 is the service providing area of the short-time travel. The correction coefficient arithmetic unit 31a obtains a weighted average of $\alpha_{i+1}$ and $\alpha_{short}$ by using following equation (12), for example, to update the correction coefficient.

$$\alpha_{short} = (1-k) \times \alpha_{short} + k \times \alpha_{i+1} \quad (12)$$

When the process at step S211 is completed, the procedure shifts to step S212.

At step S212, it is confirmed whether the vehicle travel is continued. When the vehicle travel is continued (Yes at step S212), the vehicle 2 moves to a next place i+2 on the travel route (step S213), the procedure returns to step S205, and the processes at steps S205 to S211 are repeated after "i+1" is substituted for a sign "i".

In contrast, when the vehicle travel is finished (No at step S212), a database 11 is updated by using the estimated value $G_i$ of the resistance estimated for each place traveled in current travel (step S214). When the process at step S214 is completed, this control flow is finished.

Figure 8:
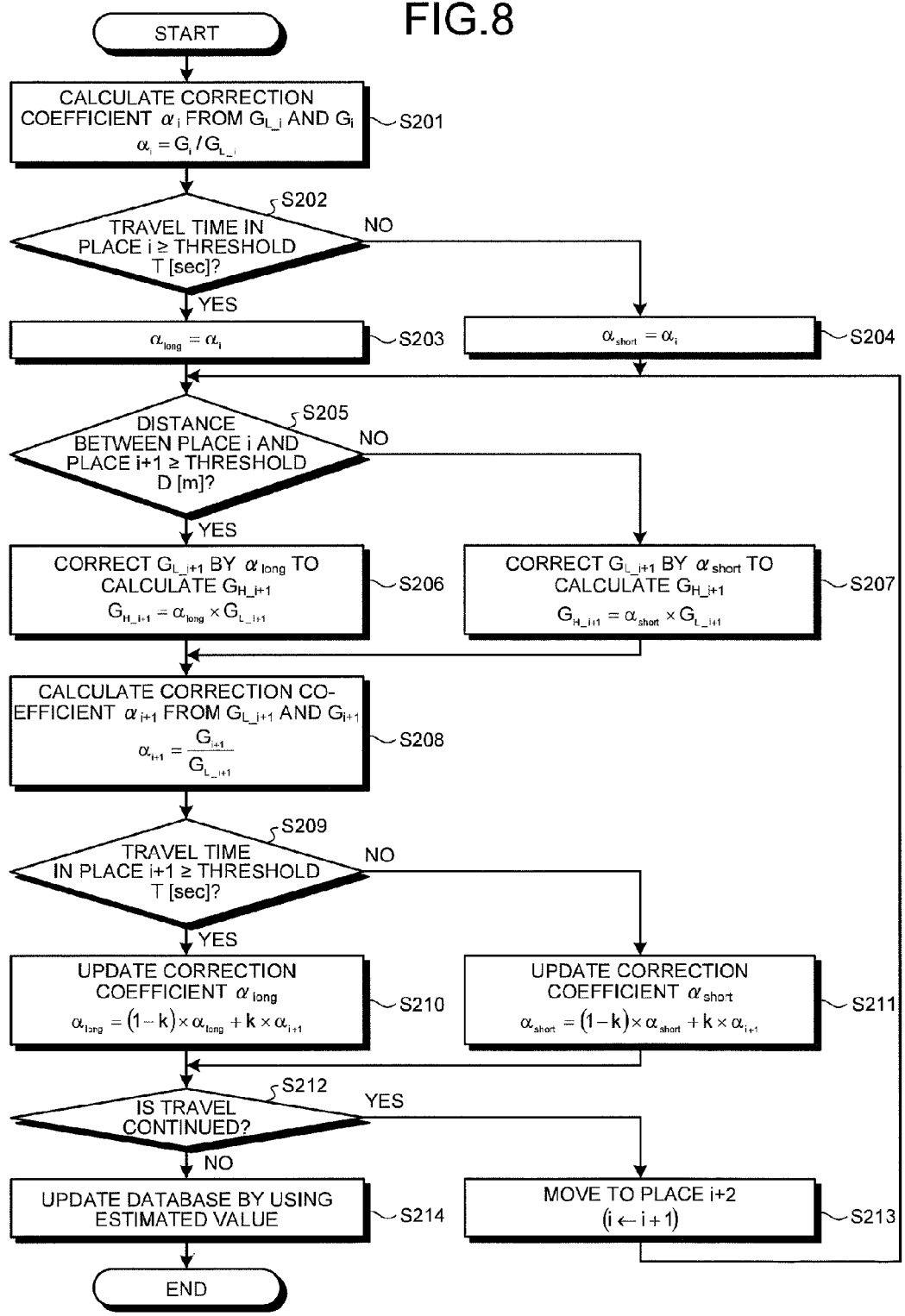
FIG. 8 is a flowchart illustrating a travel resistance correcting process performed by a driving assistance device to which a travel resistance arithmetic device according to the second embodiment is applied.

Meanwhile, although the travel time of the vehicle 2 in each area is illustrated as a determination criterion for selecting the correction coefficient updated in each service providing area from $\alpha_{long}$ and $\alpha_{short}$ as at steps S202 and S209 in FIG. 8, for example, in the above-described second embodiment, it is only required to divide according to the length of the vehicle travel in the service providing area, and a section length and an average vehicle speed of the service providing area may be used as the determination criteria, for example.

Although the distance from the previous service providing area is illustrated as the determination criterion for selecting the correction coefficient used for calculating the corrected value $G_H$ of the gradient/road surface resistance from $\alpha_{long}$ and $\alpha_{short}$ in each service providing area as at step S205 in FIG. 8, for example, in the above-described second embodiment, it is only required to divide according to the length of the vehicle travel between the service providing areas, and the travel time and the average vehicle speed of the vehicle 2 between the service providing areas may also be used as the determination criteria, for example.

In this manner, the driving assistance device 1 to which the travel resistance arithmetic device according to the second embodiment is provided changes the method of correcting the stored value $G_L$ according to the degree of separation between the service providing area (correction target area) to be corrected and the previous service providing area through which the vehicle 2 has already passed on the travel road of the vehicle 2 on the travel road of the vehicle 2. Specifically, the correction coefficient used for calculating the corrected value $G_H$ is selected from $\alpha_{long}$ and $\alpha_{short}$.

By this configuration, when the vehicle travel after the vehicle has passed through the previous service providing area is long, the gradient/road surface resistance is corrected by using the correction coefficient $\alpha_{long}$ with the high robustness against the change in the gradient/road surface resistance due to the vehicular cause which is less likely to change in a short time. In contrast, when the vehicle travel after the vehicle has passed through the previous service providing area is short, the gradient/road surface resistance is corrected by using the correction coefficient $\alpha_{short}$ with the high robustness against the change in the gradient/road surface resistance due to the environmental cause which easily changes in a short time. That is to say, it becomes possible to correct the gradient/road surface resistance by switching the two types of correction coefficients $\alpha_{long}$ and $\alpha_{short}$ with different robust characteristics according to the length of the distance between the correction target area and the previous service providing area. According to this, it becomes possible to individually optimize the corrected value of the gradient/road surface resistance according to a characteristic of each area for each service providing area in which the vehicle 2 travels. As a result, it becomes possible to correct the gradient/road surface resistance more suitably and appropriate accelerator off timing may be derived, so that it becomes possible to more appropriately perform driving assistance of accelerator off operation.

Although the embodiments of the present invention are described above, the above-described embodiments are presented as an example and it is not intended to limit the scope of the invention. The above-described embodiments may be carried out in various other modes, and it is possible to variously omit, replace, and change without departing from the spirit of the invention. The above-described embodiments and modification thereof are included in the invention recited in claims and equivalents thereof as well as in the scope and spirit of the invention.

The configuration in which the correction coefficient α is updated based on the ratio ($G/G_L$) between the stored value $G_L$ and the estimated value G of the gradient/road surface resistance is illustrated in the above-described embodiments. It is only required that the correction coefficient may be updated according to the difference between the stored value and the estimated value, and an index indicating the difference other than the ratio such as finite difference may also be used, for example.

REFERENCE SIGNS LIST

1 DRIVING ASSISTANCE DEVICE
11 DATABASE (STORING MEANS)
20 ECU
24b GRADIENT/ROAD SURFACE RESISTANCE ESTIMATING UNIT (RESISTANCE ESTIMATING MEANS)
24c GRADIENT/ROAD SURFACE RESISTANCE CORRECTING UNIT

The invention claimed is:

1. A travel resistance arithmetic device comprising:
a controller configured to estimate travel resistance which a vehicle receives from a travel road; and
a memory configured to store travel resistance in association with position information,
wherein the controller is configured to:
correct, based on difference between a stored value of the travel resistance stored in the memory in association with a predetermined area on the travel road through which the vehicle has already passed and an estimated value of the travel resistance estimated by the controller in the predetermined area, a stored value stored in the memory in association with a correction target area, wherein the correction target area is where the vehicle travels next after the predetermined area, on the travel road, to determine a corrected stored value; and
output the corrected stored value as the travel resistance in the correction target area while the vehicle travels the travel road.

2. The travel resistance arithmetic device according to claim 1, wherein the controller is configured to correct the stored value stored in the memory in association with the correction target area in further consideration of the difference between the stored value and the estimated value of the travel resistance in a past predetermined area, through which the vehicle has passed before the predetermined area and output the corrected stored value as the travel resistance in the correction target area.

3. The travel resistance arithmetic device according to claim 2, wherein the controller is configured to change a process of correcting the stored value according to a degree of separation between the correction target area and a previous correction target area through which the vehicle has already passed.

4. The travel resistance arithmetic device according to claim 3, wherein the memory is configured to store the estimated value of the travel resistance estimated by the controller as the stored value.

5. The travel resistance arithmetic device according to claim 4, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

6. The travel resistance arithmetic device according to claim 3, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

7. The travel resistance arithmetic device according to claim 2, wherein the memory is configured to store the estimated value of the travel resistance estimated by the controller as the stored value.

8. The travel resistance arithmetic device according to claim 7, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

9. The travel resistance arithmetic device according to claim 2, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

10. The travel resistance arithmetic device according to claim 1, wherein the controller is configured to change a process of correcting the stored value according to a degree of separation between the correction target area and a previous correction target area through which the vehicle has already passed.

11. The travel resistance arithmetic device according to claim 10, wherein the memory is configured to store the estimated value of the travel resistance estimated by the controller as the stored value.

12. The travel resistance arithmetic device according to claim 11, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

13. The travel resistance arithmetic device according to claim 10, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

14. The travel resistance arithmetic device according to claim 1, wherein the memory is configured to store the estimated value of the travel resistance estimated by the controller as the stored value.

15. The travel resistance arithmetic device according to claim 14, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

16. The travel resistance arithmetic device according to claim 1, wherein the controller is configured to perform the correction based on difference between travel resistance information obtained by arbitrating travel resistance information based on a travel history of an own vehicle stored in the memory, geographical information stored in map information, and travel resistance information based on a travel history of another vehicle externally obtained, and the estimated value of the travel resistance estimated by the controller in the predetermined area.

* * * * *